US011297072B2

(12) United States Patent
Nakarmi et al.

(10) Patent No.: US 11,297,072 B2
(45) Date of Patent: Apr. 5, 2022

(54) NODE AND METHOD FOR DETECTING THAT A WIRELESS DEVICE HAS BEEN COMMUNICATING WITH A NON-LEGITIMATE DEVICE

(71) Applicant: Telefonaktiebolaget LM Ericsson (publ), Stockholm (SE)

(72) Inventors: Prajwol Kumar Nakarmi, Sollentuna (SE); András Méhes, Vaxholm (SE); Karl Norrman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 102 days.

(21) Appl. No.: 16/307,604

(22) PCT Filed: Jul. 19, 2016

(86) PCT No.: PCT/EP2016/067119
§ 371 (c)(1),
(2) Date: Dec. 6, 2018

(87) PCT Pub. No.: WO2018/014937
PCT Pub. Date: Jan. 25, 2018

(65) Prior Publication Data
US 2019/0306720 A1    Oct. 3, 2019

(51) Int. Cl.
*H04L 29/06*         (2006.01)
*H04W 4/029*         (2018.01)
(Continued)

(52) U.S. Cl.
CPC ............. *H04L 63/14* (2013.01); *H04W 4/029* (2018.02); *H04W 12/122* (2021.01);
(Continued)

(58) Field of Classification Search
CPC ........... H04L 9/00; H04L 63/14; G06F 21/00; H04W 12/22; H04W 4/029; H04W 76/27; H04W 60/00; H04W 88/08; H04W 68/005
See application file for complete search history.

(56) References Cited

U.S. PATENT DOCUMENTS

2003/0232598 A1*  12/2003  Aljadeff .............. H04W 12/121
                                                              455/41.2
2006/0153153 A1    7/2006  Bhagwat et al.
(Continued)

FOREIGN PATENT DOCUMENTS

EP           2003818 A1    12/2008

OTHER PUBLICATIONS

Meyer, Ulrike, et al., "A Man-in-the-Middle Attack on UMTS", WiSe'04; Philadelphia, PA, Oct. 1, 2004, pp. 90-97.
(Continued)

*Primary Examiner* — Joseph P Hirl
*Assistant Examiner* — Leynna Truvan
(74) *Attorney, Agent, or Firm* — Sage Patent Group

(57) ABSTRACT

Embodiments herein relate to a method performed by a detecting node (101) in a communications network (100), for detecting that a wireless device, WD, (120) associated with a first domain of the communications network (100) has been communicating with a non-legitimate device (150). The non-legitimate device (150) is a device associated with a second domain of the communications network (100). The non-legitimate device (150) impersonates a network node (110, 111, 140) of a first domain of the communications network (100). The detecting node (101) obtains information regarding one or more protocol events related to the communication between the WD (120) and a first network node (110, 111, 140). The information comprises a time
(Continued)

instance related to the one or more protocol events. The detecting node (101) determines, based on the time instance and a set of time limits related to the one or more protocol events, that the WD (120) has been communicating with the non-legitimate device (150).

19 Claims, 4 Drawing Sheets

(51) Int. Cl.
*H04W 76/27* (2018.01)
*H04W 60/00* (2009.01)
*H04W 68/00* (2009.01)
*H04W 12/122* (2021.01)
*H04W 88/08* (2009.01)

(52) U.S. Cl.
CPC ......... *H04W 60/00* (2013.01); *H04W 68/005* (2013.01); *H04W 76/27* (2018.02); *H04W 88/08* (2013.01)

(56) References Cited

U.S. PATENT DOCUMENTS

| | | |
|---|---|---|
| 2008/0250500 A1 | 10/2008 | Olson et al. |
| 2009/0325543 A1 | 12/2009 | Dubois et al. |
| 2011/0281584 A1* | 11/2011 | Sander .............. H04W 36/0061 455/436 |
| 2013/0344844 A1 | 12/2013 | Goldfarb |
| 2014/0215550 A1* | 7/2014 | Adams .................. G06F 21/316 726/1 |
| 2016/0029246 A1 | 1/2016 | Mishra et al. |

OTHER PUBLICATIONS

Shaik, Altaf, et al., "Practical Attacks Against Privacy and Availability in 4G/LTE Mobile Communication Systems", NDSS '16; San Diego, CA; http://dx.doi.org/10.14722/ndss.2016.23236, Feb. 21-24, 2016, pp. 1-16.

Unknown, Author, "Intrusion detection system", Wikipedia, the free encyclopedia, Available online at: http://wikipedia.org/wiki/Intrusion_detection_system, Oct. 27, 2014, pp. 1-8.

* cited by examiner

NODE AND METHOD FOR DETECTING THAT A WIRELESS DEVICE HAS BEEN COMMUNICATING WITH A NON-LEGITIMATE DEVICE

TECHNICAL FIELD

Embodiments herein relate to a detecting node and a method therein. In particular, it relates to a method and a detecting node for detecting that a wireless device has been communicating with a non-legitimate device, such as e.g. with a false base station.

BACKGROUND

Wireless devices (WDs) such as mobile terminals are enabled to communicate wirelessly in a cellular communications network or wireless communication system, sometimes also referred to as a cellular radio system or cellular networks. The communication may be performed e.g. between two mobile terminals, between a mobile terminal and a regular telephone and/or between a mobile terminal and a server via a Radio Access Network (RAN) and possibly one or more core networks, comprised within the cellular communications network.

Mobile terminals may further be referred to as User Equipment (UE), wireless communication devices, wireless devices, wireless terminals, mobile stations, mobile telephones, cellular telephones, laptops, tablet computers or surf plates with wireless capability, just to mention some further examples. The mobile terminals in the present context may be, for example, portable, pocket-storable, hand-held, computer-comprised, or vehicle-mounted mobile devices, enabled to communicate voice and/or data, via the RAN, with another entity, such as another wireless terminal or a server.

The cellular communications network covers a geographical area which is divided into cell areas, wherein each cell area being served by a radio network node. A cell is the geographical area where radio coverage is provided by the radio network node. The cellular communications network may be an 3GPP Long Term Evolution (LTE), Evolved Universal Terrestrial Radio Access Network (E-UTRAN), Wideband Code Division Multiple Access (WCDMA), GSM network, any 3GPP cellular network, Worldwide Interoperability for Microwave Access (WiMax), or any wireless network or system. In some embodiments the non-limiting term radio network node is more commonly used and it refers to any type of network node serving mobile terminal and/or connected to other network node or network element or any radio node from where mobile terminal receives signal. Examples of radio network nodes are Node B, Base Station (BS), Multi-Standard Radio (MSR) radio node such as MSR BS, eNode B, network controller, Radio Network Controller (RNC), base station controller, relay, donor node controlling relay, Base Transceiver Station (BTS), Access Point (AP), transmission points, transmission nodes, RRU, RRH, nodes in distributed antenna system (DAS) etc.

The radio network node may further control several transmission points, e.g. having Radio Units (RRUs). A cell may thus comprise one or more radio network nodes each controlling one or more transmission/reception points. A transmission point, also referred to as a transmission/reception point, is an entity that transmits and/or receives radio signals. The entity has a position in space, e.g. an antenna. A network node is an entity that controls one or more transmission points. The network node may e.g. be a base station such as a Radio Base Station (RBS), eNB, eNodeB, NodeB, B node, or Base Transceiver Station (BTS), depending on the technology and terminology used. The base stations may be of different classes such as e.g. macro eNodeB, home eNodeB or pico base station, based on transmission power and thereby also cell size.

Each network node may support one or several communication technologies. The network nodes communicate over the air interface operating on radio frequencies with the mobile terminals within range of the network node. In the context of this disclosure, the expression Downlink (DL) is used for the transmission path from the base station to the mobile station. The expression Uplink (UL) is used for the transmission path in the opposite direction i.e. from the mobile terminal to the base station.

In 3rd Generation Partnership Project (3GPP) Long Term Evolution (LTE), network nodes, which may be referred to as eNodeBs or even eNBs, may be directly connected to one or more core networks. In LTE the cellular communication network is also referred to as Evolved Universal Terrestrial Radio Access Network (E-UTRAN).

An E-UTRAN cell is defined by certain signals which are broadcasted from the eNB. These signals contain information about the cell which may be used by mobile terminals in order to connect to the network through the cell. The signals comprise reference and synchronization signals which the mobile terminal uses to find frame timing and physical cell identification as well as system information which comprises parameters relevant for the whole cell.

Current telecommunication systems are vulnerable to false base station attacks, e.g. when a non-legitimate device intercepts the traffic between a WD and a network node. The reason for this is that the mobile terminal may not determine whether requests for a long term mobile terminal identity, which applies to e.g. GSM, 3G and LTE RATs, or requests for use of no-encryption, which applies e.g. to GSM, comes from a legitimate network or not. It is hence difficult to prevent false base station attacks without large modifications to the radio protocols. The false base station may be any radio network node which may be able to serve a network device, such as a mobile terminal, and wherein the false base station may impersonate a legitimate network node towards the network device. The false base station may impersonate a service provider's real network nodes in order to lure a WD into connecting to the false base station. Hence, the network device will interpret the false base station as a legitimate network node. The false base station may then monitor and record data and voice traffic, as well as the position of the WD, which may be used to collect information about a user.

A non-legitimate device, which may also be referred to as a false Radio Base Station (RBS), is a device used e.g. to eavesdrop and/or intercept traffic between mobile terminal (s) and a legitimate network. The legitimate network relates to a first domain of a communications network, wherein the first domain comprises network nodes operated by a network provider which a user and/or a user's WD has a service agreement with. The first domain may also comprise network nodes of roaming partners to the network provider. The fundamental step of a false RBS attack is to impersonate the legitimate network and to allure or force WDs to camp on or attach to the non-legitimate device. Other popular names for a non-legitimate device are false RBS, International Mobile Subscriber Identity (IMSI) catcher, rogue base station, false base station, false BTS, and/or cell-site simulator. There are two characteristic behaviors commonly associated with a non-legitimate device. The first characteristic, from which the device derives the IMSI-catcher name, is to send an identity request message to WD to obtain the WDs long-term subscriber identifier, such as e.g. the IMSI. This behavior is used to track which WDs are present in a cell. The second behavior is more complex and involves eavesdropping on on-going phone calls and data connections. The second behaviour typically involves a Man in the Middle (MitM) attack as described below.

False GSM RBSs have caused a lot of publicity lately when discovered around government facilities around the world. While 3G and 4G false RBSs have not yet been widely discovered, essentially the same principles still apply in these Radio Access Technologies (RAT)s and may also apply to 5G. It is therefore important to be able to detect and counter attacks based on false RBSs.

A false RBS may perform a MitM attack on the communication between a WD, which may also be referred to as a victim, and a legitimate RBS in GSM. The MitM attack can be of two types. In the first type, the attacker modifies the message between the victim WD and the network; and, in the second type, the attacker acts as a network towards the victim and as a valid subscriber towards the legitimate network. In attacks of the later type, the attacker forwards the user plane traffic of the victim WD using the attacker's own connection with the legitimate network.

As an example of the first attack type, the attacker may perform a bidding down attack on the capability negotiation, or break the GSM encryption. The bidding down attack on the capability negotiation essentially consists of intercepting uplink messages in which the WD provides the network with the supported encryption algorithms. The interception is typically done using a false RBS. After intercepting the message, the attacker can send a corresponding message to the real network, where the corresponding message only contains encryption algorithms that the attacker can break. Breaking the GSM encryption algorithm to get access to the user plane data does not require a false RBS per se, since a passive eavesdropping device is sufficient to collect the data. The breaking of the encryption can then be done locally. However, using a false base station simplifies capturing data from the victim, since the attacker then can control all aspects of the air interface, such as e.g. frequency hopping and handovers. Using a bidding down attack to force the WD to not use any encryption, such as e.g. using the encryption algorithm A5/0, may raise suspicion by the victim. Hence, the attacker may select a real encryption algorithm and break the encryption in order to remain undetected by the WD.

The second attack type is useful when the first attack type does not succeed due to security restrictions in the network, e.g. if the network does not allow unencrypted traffic. In that case, the false RBS might act as a valid WD towards the true RBS with a legitimate Subscriber Identity Module (SIM), while acting as an RBS towards the WD. The false RBS still has to tell the WD to turn off encryption, because the false RBS does not have access to the WDs key. In UMTS, even though there is mutual authentication between the WD and the network, a false GSM RBS can still trick a GSM-compatible UMTS WD; that is, a WD equipped with a 3G Universal Subscriber Identity Module (USIM), that is capable of using both Universal Terrestrial Radio Access Network (UTRAN) and GSM Edge Radio Access Network (GERAN). The attacker obtains the IMSI of the WD 120 and uses that IMSI to obtain a valid Authentication Token (AUTN) from the legitimate network node 110, 111, 140. Once the WD 120 is lured to connect to the non-legitimate GSM RBS, the obtained valid AUTN is used in the authentication procedure, which will be accepted by the WD 102. The attacker does not have access to the encryption key corresponding to the authentication run associated with the valid AUTN, but since the WD 120 is connected to the attacker's false base station in GERAN, the attacker can select "no encryption" for the WD 120.

It is also possible for an attacker to simply jam UMTS or LTE frequencies to force a WD to fall back to GSM. However, jamming is disadvantageous for an attacker, since such an attack may be prone to discovery.

For IP networks there exists solutions for determining an intrusion in the network, such as e.g. a Network Intrusion Detection System (NIDS). NIDS is a network security system focusing on the attacks in the network. The NIDS is usually located in the network infrastructure, such as e.g. at a network node, and monitors the traffic passing the network node.

However, false RBS attacks tend to target end users, not the infrastructure, and packets from a false RBS may or may not be visible to a NIDS installed at the victim's home network. Hence, a NIDS may not be able to discern and, hence, detect such an attack.

SUMMARY

It is therefore an object of embodiments herein to provide a method for detecting that a Wireless Device (WD) has been communicating with a non-legitimate device.

According to a first aspect of embodiments herein, the object is achieved by a method, performed by a detecting node in a communications network, for detecting that a wireless device (WD) associated with a first domain of the communications network has been communicating with a non-legitimate device. The non-legitimate device is a device associated with a second domain of the communications network, which device impersonates a network node of a first domain of the communications network. The detecting node obtains information regarding one or more protocol events related to the communication between the WD and a first network node, wherein the information comprises a time instance related to the one or more protocol events. The detecting node further determines, based on the time instance and a set of time limits related to the one or more protocol events, that the WD has been communicating with the non-legitimate device.

According to a second aspect of embodiments herein, the object is achieved by a detecting node in a communications network, for performing the method for detecting that a wireless device (WD) associated with a first domain of the communications network has been communicating with a non-legitimate device. The non-legitimate device is a device associated with a second domain of the communications network. The device impersonates a network node of a first domain of the communications network. The detecting node is configured to obtain information regarding one or more protocol events related to the communication between the WD and a first network node. The information comprises a time instance related to the one or more protocol events. The detecting node determines, based on the time instance and a set of time limits related to the one or more protocol events, that the WD has been communicating with the non-legitimate device.

According to a third aspect of embodiments herein, the object is achieved by a computer program comprising instructions, which, when executed on at least one processor, causes the at least one processor to carry out the method as performed by the detecting node.

According to a fourth aspect of embodiments herein, the object is achieved by a computer-readable storage medium, having stored thereon a computer program comprising instructions which, when executed on at least one processor, cause the at least one processor to carry out the method as performed by the detecting node.

The embodiments of the method described herein have the advantage that it not only allows a communications network to detect that a non-legitimate device is present in the network, but also allow the communications network to detect which subscribers or devices are or have been connected to the non-legitimate device. The embodiments further have the advantage that the communications network may determine which WDs have been communicating with a non-legitimate device without having to perform any adaptations, such as installing apps or special features on the WD itself. Thereby the method may be implemented in a cost efficient manner.

Further, the detecting node may be comprised in existing node, such as radio network nodes, core network nodes or in a distributed node comprised in a cloud environment, where the functionality of the detecting node may be added by performing a software update. Thereby, the cost and effort for implementing and maintaining the embodiments herein may further be reduced. Since the implementation of the embodiments do not require a hardware upgrade of current communication networks, but only requiring a software upgrade of these, the implementation is very cost effective. The software may e.g. be installed and/or updated in existing nodes remotely, i.e. from a location different than the location where the node is placed. Hence, there is no need for personnel to travel to the location of the node to perform the update, which also reduces the costs for implementing the method described herein.

A further advantage with the embodiments herein is that they allow a collection of measurements over a large coverage area, since each node may perform measurements in the network surroundings of each WD. Hence, a fast and efficient detection of all WDs in the network having been connected to a non-legitimate device is provided.

Moreover, the embodiments herein allow an operator of a communications network to perform real-time collection and analysis of data directly from the communications network, in order to detect a false base station in a fast and efficient way.

Identifying the victim WDs, allows the network to take reactive actions, e.g. informing the corresponding WD, or rejecting calls to and from the WD.

Furthermore, since the method herein relies directly on data originating from the network itself, it is much less susceptible to tampering than data collected in the WDs.

BRIEF DESCRIPTION OF THE DRAWINGS

Examples of embodiments herein are described in more detail with reference to attached drawings in which.

DETAILED DESCRIPTION

In some embodiments herein the general term "network node" is used and it may correspond to any type of radio network node or any network node, which communicates with at least a radio network node. Examples of network nodes are any radio network node stated above; a core network node, such as e.g. a Mobile Switching Centre (MSC), a Mobility Management Entity (MME), an Operations & Management (O&M) node, an Operation, Administration and Maintenance (OAM) node, an Operations Support Systems (OSS) node, a Self-Organizing Network (SON) node, a positioning node, such as e.g. an Enhanced Serving Mobile Location Centre (E-SMLC), or a function related Minimization of Drive Tests (MDT) etc.

In some embodiments the non-limiting term network device is used and it refers to any type of wireless device communicating with a network node in a cellular or mobile communication system and being able to perform measurements on other network nodes in a surrounding or tracking area of the network device. Examples of a network device are UE, mobile terminal, target device, device to device UE, machine type UE or UE capable of machine to machine communication, PDA, iPAD, Tablet, mobile terminals, smart phone, Laptop Embedded Equipment (LEE), Laptop Mounted Equipment (LME), USB dongles, radio network node, radio access node etc.

Figure 1:
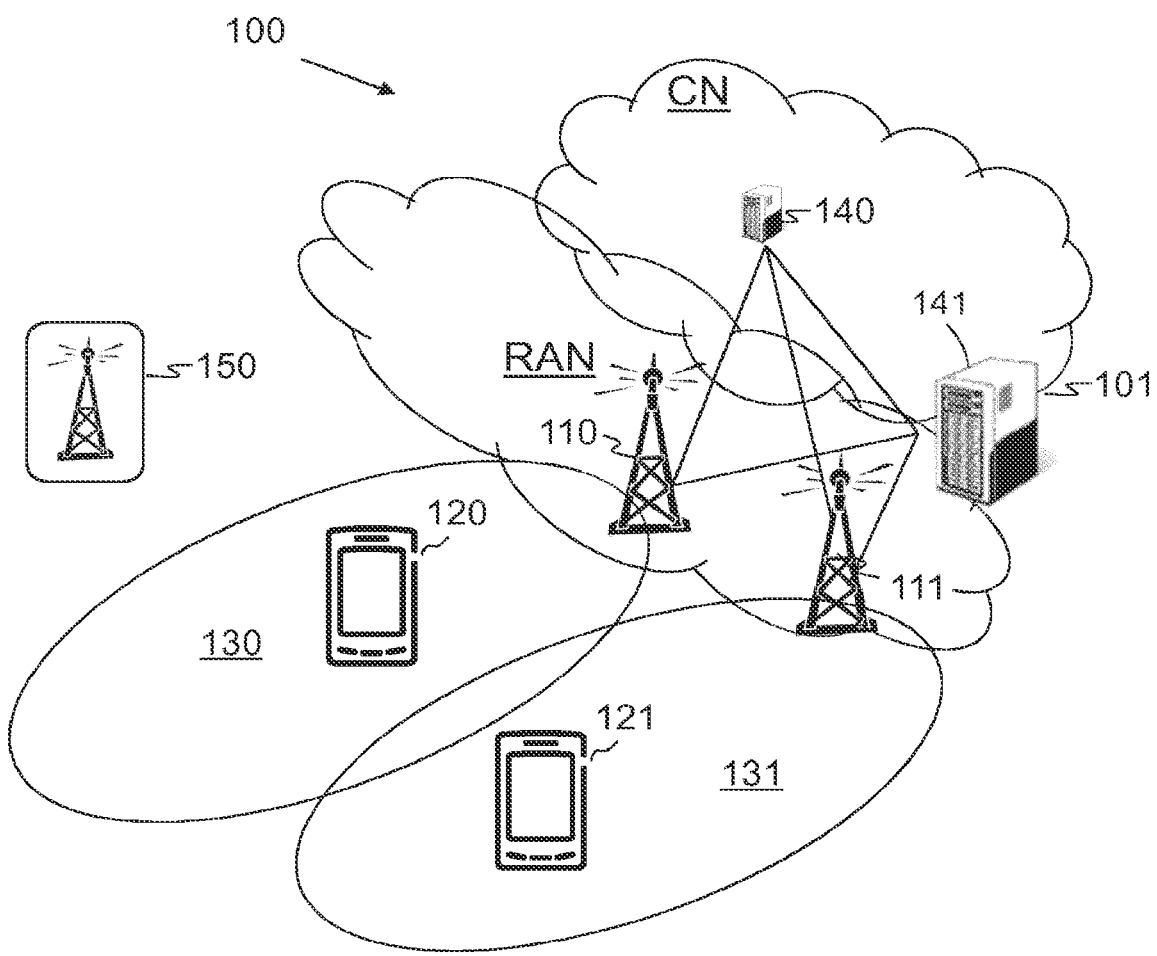
FIG. 1 is a schematic block diagram illustrating embodiments of a communications network.

FIG. 1 depicts an example of a communications network 100 according to a first scenario in which embodiments herein may be implemented. The communications network 100 is a wireless communication network such as e.g. an LTE, E-Utran, WCDMA, GSM network, any 3GPP cellular network, Wimax, or any cellular network or system.

The communications network 100 comprises a Radio Access Network (RAN) and a Core Network (CN). The communication network 100 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. In the communication network 100, one or more WDs 120 may communicate via one or more Access Networks (AN), e.g. RAN, to one or more CNs. The WDs 120 may e.g. be a user equipment (UE), a mobile station, a non-access point (non-AP) STA, a STA, and/or a wireless terminal. It should be understood by those skilled in the art that "wireless device" is a non-limiting term which means any terminal, wireless communication terminal, user equipment, Machine Type Communication terminal, user equipment, Machine Type Communication (MTC) device, Device to Device (D2D) terminal, or node e.g. smart phone, laptop, mobile phone, sensor, relay, mobile tablets or even a base station communicating within a cell.

The RAN comprises a set of radio network nodes, such as radio network nodes 110, 111 each providing radio coverage over one or more geographical areas, such as a cell 130, 131 of a radio access technology (RAT), such as LTE, UMTS, Wi-Fi or similar. The radio network node 110, 111 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the cell, which may also be referred to as a service area, served by the radio network node 110, 111 depending e.g. on the first radio access technology and terminology used.

The CN further comprises a core network node 140 which is configured to communicate with the radio network nodes 110, 111, via e.g. an S1 interface. The core network node may e.g. be a Mobile Switching Centre (MSC), a Mobility Management Entity (MME), an Operations & Management (O&M) node, an Operation, Administration and Maintenance (OAM) node, an Operations Support Systems (OSS) node and/or a Self-Organizing Network (SON) node. The core network node 140 may further be a distributed node comprised in a cloud 141.

The WD 120 is located in the cell 130 of the network node 110, which is referred to as the serving cell, whereas the cell 131 of the network nodes 111 are referred to as neighboring cells. Although, the network node 110 in FIG. 1 is only depicted providing a serving cell 130, the network node 110 may further provide one or more neighboring cells 131 to the serving cell 130.

The communications network 100 further comprises a detecting node 101 which is configured to determine if the WD 120 has been communicating with a non-legitimate device 150 comprised in the communications network 100. The detecting node 101, the radio network nodes 110, 111 and the core network node are all associated with a first domain of the communications network 100. The first domain is a part of the network which is operated by a provider with which a user or a WD 120 has a service agreement. Network nodes operated by a roaming partner of the provider are also associated with the first domain. The first domain of the communications network 100 may herein also be referred to as the legitimate network. The non-legitimate device 150 is a device associated with a second domain of the communications network 100, i.e. a domain not operated by the provider or a roaming partner. The non-legitimate device 150 impersonates a network node 110, 111, 140 of a first domain of the communications network 100 in order to try to lure the WD 120 to connect to the device. The second domain of the communications network 100 may herein be referred to as a non-legitimate network.

The WDs 120, 121 may further be configured to communicate over a plurality of different RATs, such as LTE, UMTS, Wi-Fi or similar.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB, GSM network, any 3GPP cellular network or any cellular network or system, may also benefit from exploiting the ideas covered within this disclosure.

Also note that terminology such as network node and network device should be considering non-limiting and does in particular not imply a certain hierarchical relation between the two; in general "network node" may be considered as a first device, or device 1, and "network device" may be considered as a second device, or device 2, and these two devices may communicate with each other over a radio channel. The embodiments herein further focus on wireless transmissions in the downlink, however the embodiments herein are equally applicable in the uplink.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

The detecting node 101 may have different sets of data stored for performing the method described herein. The data may be stored in a memory of the detecting node 101. The set of data may e.g. comprise a set of statistics measurements over global events in the communications network 100. Examples of such statistics measurements may e.g. be the number of times one or more WDs have sent Tracking Area Updates in a certain tracking area and the average deviation in time between an expected periodic Tracking Area Update and the reception of the actual message at a core network node, such as e.g. an (MME).

Furthermore, the sets of data may comprise profiles with similar statistic measurements for each WD 120. These profiles may be referred to as local events in contrast to the global events discussed above. The local events may comprise, for example, time instances for each Non Access Stratum (NAS) or Radio Resource Control (RRC) message a WD sends and/or has sent, as well as the type of each message.

The WD 120 may be identified by, for example, an IMSI or an International Mobile Station Equipment Identity (IMEI). A WD 120 may be considered as a combination of a USIM and the actual device. Since the USIM may be moved to a different devices it may not always be a one-to-one mapping between the two identifiers. Hence, the data related to an IMSI may be stored separate from the data related to an IMEI and the data may be combined when they are likely to refer to the same WD 120.

The sets of data may further comprise rules for how the global and local statistic measurements shall be combined in order to determine whether the WD may have been connected to the non-legitimate device 150, i.e. if the WD 120 is a victim of a false RBS attack. The rules may also keep state, which means that a rule may use information related to previous applications of the rule, or information related to other rules as part of the determination. As an example, a meta-rule may indicate that a WD 120 has been communicating with the non-legitimate device 150, if a specific rule has been triggered more than e.g. five times in the last two minutes, or two other specific rules have independently indicated that the WD 120 may have been connected to the non-legitimate device 150. This state information may also be stored in the detecting node 101.

The detecting node 101 may further apply the rules to collected data, e.g. by means of a determining module, and may indicate that a WD 120 is a victim to a non-legitimate device 150, should the analysis result in a verdict that the WD 120 may have been communicating with a non-legitimate device 150. The detecting node 101 may forward the alert to inform external functions about the verdict.

The detecting node 101 may be implemented as a stand-alone entity, but it may also be implemented as an embedded functionality that is part of an existing node, such as e.g. a radio access node 110, 111 or a core network node 140 or a distributed node comprised in the cloud 141. However, the detecting node may also be implemented as a logical entity distributed in part over several existing nodes working together in concert. An example of the first case is a core network node 140, such as an MME, that collects statistics of the incoming NAS messages from terminals. Based on these statistics, the detecting node 101, which in this example may be comprised in the core network node 140, detects anomalies using the techniques described in the method embodiments below.

The detecting node 101 may also be implemented as a standalone entity. In such a scenario the detecting node 101 may obtain the information regarding the protocol events by being fed event data from probes in the network. The term "probe" should here be understood as any entity performing measurements; which may be existing measurement points in network nodes such as core network nodes 140 and/or radio network nodes 110, 111, but may also be dedicated entities deployed in the communications network 100 for the particular purpose of collecting data required by the detecting node 101 to perform the method disclosed herein. Probes may be located in the Radio Access Network (RAN), in a transport network, in the core network or in an arbitrary combination of the above. Probes located in the RAN may collect statistics of RRC signaling, Packet Data Convergence Protocol (PDCP) packets, X2AP or S1AP messages. Probes in the transport network clearly have a less explicit view of the traffic belonging to a specific terminal; this is in particular true for LTE where the S1 and X2 links are confidentiality protected. However, confidentiality protection is only protects the confidentiality of the data while in transit over the links. The data is available in clear text at intermediate sites, such as e.g. at network nodes 110, 111, 140. For example, assume a node A sends a message targeted at a node C, but the message is sent via a node B. In this case, the confidentiality protection may be applied on the links between A and B, and between B and C. Node B has access to the data in clear text. This confidentiality protection model is sometimes referred to as hop-by-hop. When the hop-by-hop model is applied, probes may be placed in sites terminating a hop. When placed in the core network, the probes may collect data from GPRS Tunneling Protocol (GTP), both control and user plane data. Concrete examples of collected data are any field in packet headers, cell-trace data from an radio network node 110, 111 or EMB events from a core network node 140. The collection of data can be done either passively or actively.

The detecting node 101 may further store the collected data in a storage, such as e.g. on a memory and may obtain and/or retrieve the data from the storage when performing the method disclosed herein. This may be useful, e.g. if the analysis is done in batches and not on a continuous stream of obtained event data.

Figure 2:
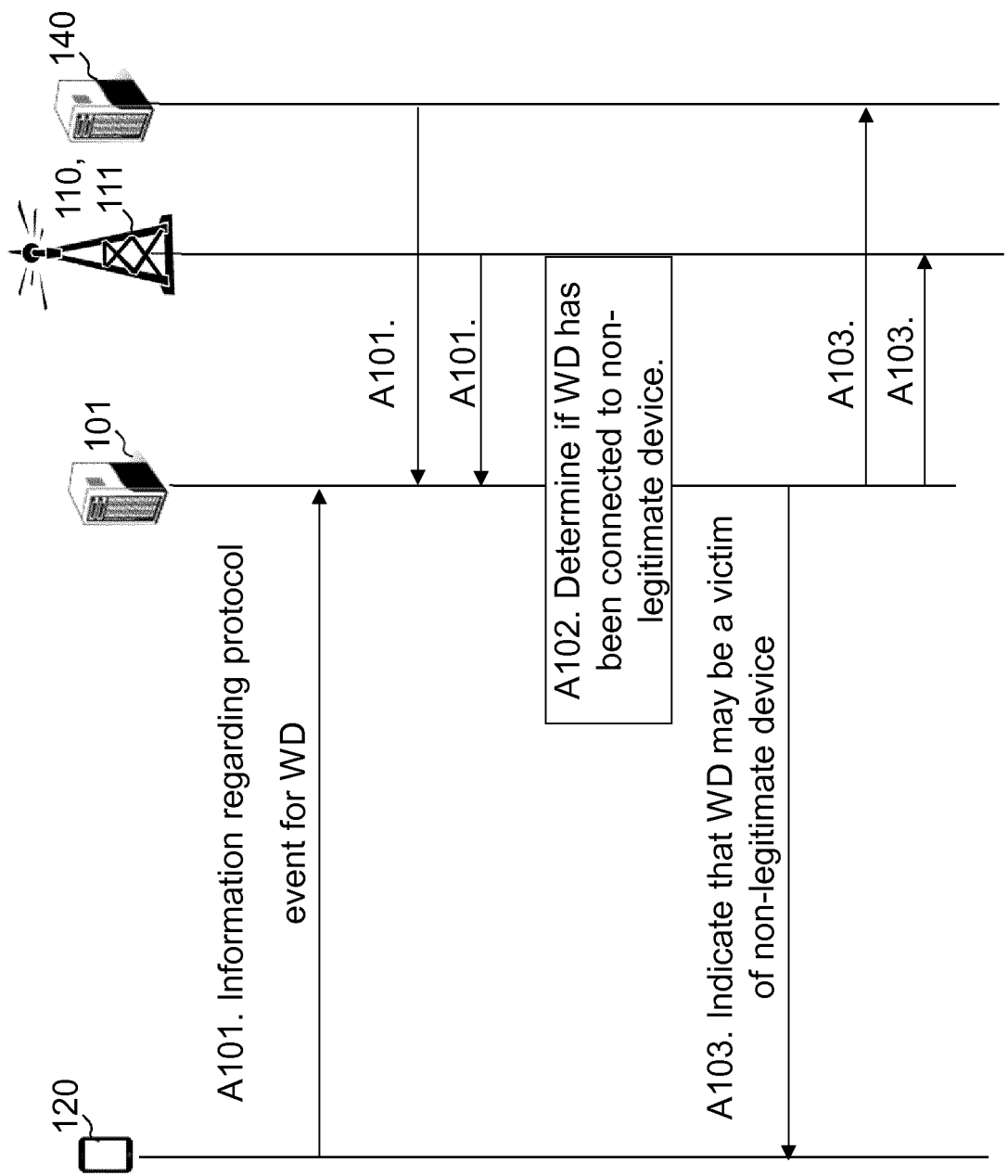
FIG. 2 is a signaling diagram depicting the method according to embodiments herein when performed in a communications network.

FIG. 2 is a sequence diagram illustrating the method for determining if the WD 120 has been communicating with the non-legitimate device 150, when performed in the communications network 100.

Action A101

The detecting node 101 obtains information regarding a protocol event relating to a communication between the WD 120 and a network node 110, 111, 140. The obtaining of information may comprise collecting at least one protocol message from the communications network 100. The information may be obtained by receiving the information from the WD 120 and/or from any of the network nodes 110, 111, 140.

Figure 3:
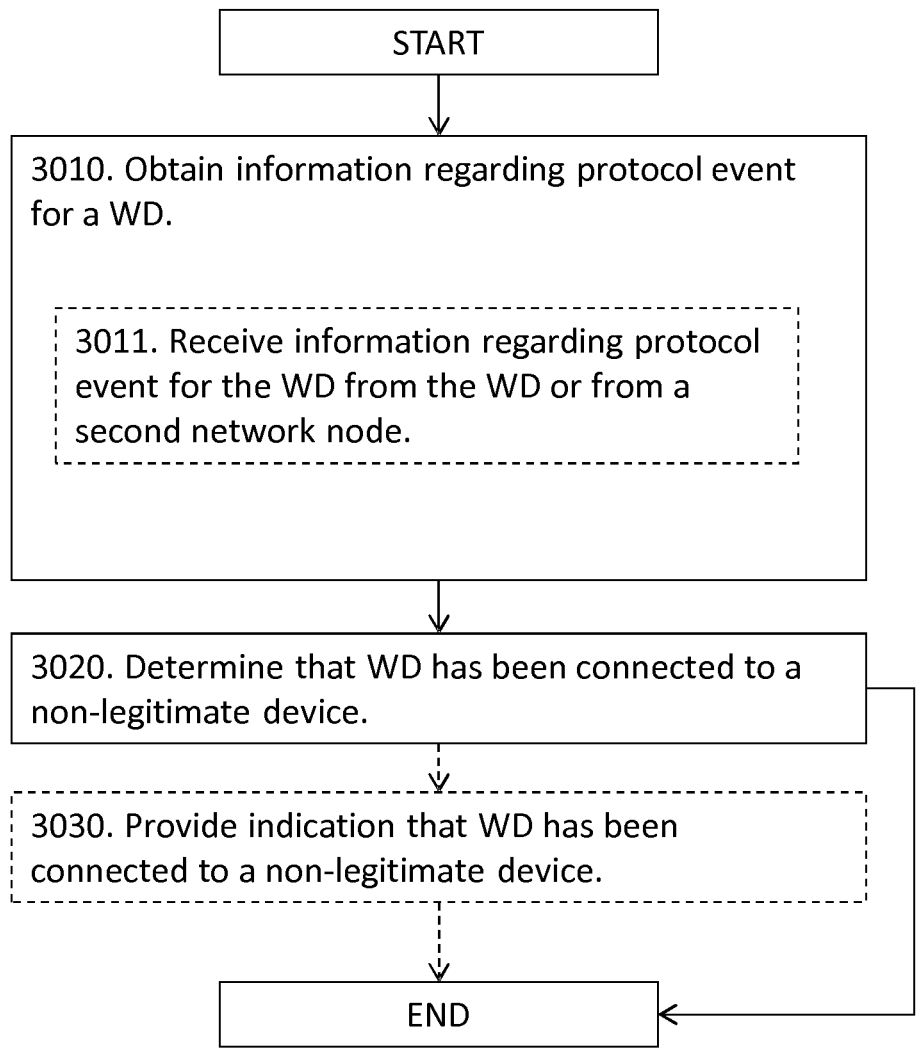
FIG. 3 is a flow chart illustrating embodiments of the method performed in a detecting node.

Action A101 corresponds to Action 3010 as discussed in the following with regards to FIG. 3.

Action A102

When the detecting node 101 has obtained the information regarding the protocol event relating to a communication between the WD 120 and a network node 110, 111, 140, the detecting node determines if the WD 120 has been communicating with a non-legitimate device 150 based on the obtained event information and a set of time limits and rules related to the events, which may also be referred to as determining rules, stored in the detecting node 101.

The determining rules may be applied one-by-one to different fields of an obtained protocol message and the associated stored data. The different rules that may be applied are further discussed under Action A302 with regard to FIG. 3. The content of the received protocol message and the associated data may further be used to limit the set of determining rules applied to only those that make use of these items either directly or indirectly, such as e.g. via meta-rules.

Different rules may provide more or less support to an assumption that a given WD 120 has been communicating with a non-legitimate device 150. In some cases, the application of a rule may simply result in a change of global or local state, such as e.g. about a type of behavior observed across a plurality of WDs 120, or a confidence value about a specific WD 120 having been connected to the non-legitimate device 150, which may be acted upon by a meta-rule, or possibly the same rule, once more support is gathered. A very strong indication that a WD 120 has been communicating with a non-legitimate device 150 is usually when the detecting node 101 has observed several suspicious events in succession.

The detecting node 101 may further parse the message to determine the protocol/message type and the different identifiers, such as IMSIs or IMEIs, to allow retrieving the corresponding local and global profiles and other relevant data from the storage.

Action A102 corresponds to Action 3020 as discussed in the following with regards to FIG. 3.

Action A103

When one or more of the applied rules have provided significant evidence for a WD 120 being the victim of an attack, the detecting node 101 may provide an indication that the WD 120 has been communicating with the non-legitimate device to a second entity.

The indication may e.g. be forwarded to external systems, such as e.g. the network nodes 110, 111, 140, the WD 120 or an OSS/BSS, a SIEMs, a customer care, or any other function that might benefit from receiving this indication.

Action A103 corresponds to Action 3030 as discussed in the following with regards to FIG. 3.

Example of embodiments of the method performed by a detecting node 101 in a communications network 100, for detecting that a WD 120 associated with a first domain of the communications network 100 has been communicating with a non-legitimate device 150, will now be described with reference to a flowchart depicted in FIG. 3. The non-legitimate device 150 is a device associated with a second domain of the communications network 100, which device impersonates a network node 110, 111, 140 of a first domain of the communications network 100.

The method may comprise the following actions, which actions may be taken in any suitable order. Dashed lines of a box in FIG. 4 indicate that this action is not mandatory.

Action 3010

The detecting node 101 obtains information regarding one or more protocol events related to the communication between the WD 120 and a first network node 110, 111, 140. The information comprises information regarding a time instance related to the one or more protocol events. The time instance related to the one or more protocol events, may be defined by the detecting node 101 itself, e.g. by starting a timer. The detecting node 101 may however also receive information regarding a time instance related to the one or more protocol events by any other network node 110, 111, 140 or by the WD 120. The information regarding the time instance may be sent to the detecting node 101 in the form of a time stamp comprising information regarding the time instance. The protocol event may be any or a combination of a sending of an RRC message, an authentication procedure, an initiation of a network attach procedure, a reporting of security capabilities from the WD 120 to the communications network 100, a location update procedure, a paging of the WD 120 and/or a Tracking Area Update (TAU) request from the WD 120.

The detecting node 101 may obtain measurements and events from various parts of the communications network 100. The data may be obtained either passively, such as e.g. by tapping to an interface, subscribing to some events, etc., or actively, such as e.g. by querying for specific data from a certain network node 110, 111, 140, or retrieving information from a storage. For efficiency, the detecting node 101 may employ a filter to only collect messages relevant for performing the method, i.e. relating to the determining rules that may be stored in the detecting node 101. In general however, any message in the communications network to and from WDs, and/or between different network elements, may be collected.

Action 3020

The detecting node 101 is further configured to determine, based on the time instance and a set of time limits related to the one or more protocol events, that the WD 120 has been communicating with the non-legitimate device 150.

This may be determined by analyzing the time differences between certain types of protocol messages associated with the identity of the WD 120. The identity of the WD 120 may e.g. be determined based on an International Mobile Subscriber Identity (IMSI) and/or an International Mobile Equipment Identity (IMEI). Exemplary embodiments of the determining is described in the following.

According to a first embodiment herein when the protocol event which the detecting node 101 has obtained information about is the sending of an RRC message. The detecting node 101 determines the WD 120 to have been communicating with the non-legitimate device 150 when the number of RRC messages to the first network node 110, 111, 140, is reduced below a first threshold and a corresponding increase is not detected in a set of second network nodes 110, 111, 140 associated with the first domain of the communications network 100 within a first time limit from the time instance of the reduction of the number of RRC messages below the first threshold. The first time limit is comprised in a set of time limits.

Hence, when the number of RRC messages observed in a first network node 110, 111, 140, associated with the first domain such as e.g. an eNB, declines sharply, but a corresponding increase in neighboring network nodes, associated with the first domain of the communications network 100, is not detected, the detecting node may flag the subscriber or the devices that were in the corresponding cell as potential victims.

An attacker may launch a MitM attack by acting as a valid WD towards a true Radio Base Station (RBS) and acting as an RBS towards a victim WD. If the attacker is only interested in a Denial of Service (DoS) attack, the attacker may for example jam the radio frequencies or send fake TAU or Attach rejects. During all of these attacks, the victim WDs are disconnected from the legitimate network, i.e. they do not communicate with the RAN and CN nodes associated with a first domain of the communications network. Specifically, the RAN of the legitimate network will not receive any RRC messages from WDs during the attack. Therefore, the RAN nodes or probes are ideal places for early detection of a decline in the number of active WDs. According to one example when the first network node 110, 111, 140 is an eNB 110, the eNB 110 may detect a decrease or increase in the number of RRC messages it processes. A sharp decline in the number of RRC messages processed by one eNB 110 without any increase in the number of RRC messages processed by any other eNB 111 of the first domain of the communications network 100 implies that the WDs have "disappeared" from the legitimate network. These WDs 120 may potentially have fallen victim to a false RBS attack, i.e. may have been connected to a non-legitimate device 150 associated to a second domain of the communications network 100.

This embodiment of detection is beneficial when targeted at high-risk network nodes 110, 111, 140, such as eNBs. For example, assume an eNB is located close to a government building and measurements are made at that particular eNB, which may herein be referred to as a targeted eNB, and all of its neighbors. In case the number of RRC messages decrease at the targeted eNB, a corresponding increase can be expected at surrounding eNBs within a short period of time.

The RAN nodes or probes may regularly report their RRC load statistics measurements to the detecting node 101 at predefined intervals. Alternatively, the detecting node 101 may itself collect load statistics measurements by counting the number of RRC messages for all the RAN nodes under observation. The first embodiment of the method may also be described in the form of a rule stored in the detecting node 101, which rule may herein also be referred to as Rule #1. According to Rule #1 the WD 120 may be determined to have been connected to a non-legitimate device 150 when the time difference between a load statistics measurement at a first network node 110, 111, 140, associated with the first domain, in which the load decreases by X percent or more, and one or more other load statistics measurements at neighboring network nodes 110, 111, 140, associated with the first domain, in which a corresponding total increase of at least X percent is detected, is more than a first time limit. If the detecting node determines that Rule #1 has been triggered, the first network node that experienced the decrease in RRC load may be identified and the CN nodes may be consulted in order to obtain the identities of the subscribers or WDs that were in a cell of the first network node 110. These subscribers or WDs 120 may have been connected to a non-legitimate device and may thereby be potential victims of a false RBS attack. The threshold parameter X and the first time limit may be derived manually based on past statistics, or predicted automatically e.g. via machine learning. The threshold parameters may also be specific depending on the neighborhood of the detecting node 101.

The first time limit is may e.g. be in the rage of seconds to hours depending on the environment. The first time limit may e.g. be 1-10 seconds, since handovers generally finish within seconds. In a second scenario, the first time limit may be e.g. 2-3 hours in areas where people might switch off their WDs for some hours, such as e.g. in a movie hall. Setting a low time limit increases the chances of detecting that a WD 120 has been communicating with a non-legitimate device 150 but may also lead to an increased number of false positives. Setting a high time limit reduces the risk of false positives but may increase the risk of not detecting that a WD 120 has been communicating with a non-legitimate device 150.

Preferably the first time limit may be in the range of minutes, such as e.g. 5-30 minutes, since the WD may e.g. be located on a subway and some subway lines might be out of coverage.

According to a second embodiment a WD 120 may be determined to have been connected to a non-legitimate device when the WD 120 associated with a 3G USIM subscription aborts an authentication procedure just after the authentication request is sent by the network. Herein, the protocol event which the detecting node 101 has obtained information about is the authentication procedure. The detecting node 101 determines the WD 120 to have been communicating with the non-legitimate device 150 when a time between a time instance of an authentication request sent to the WD 120 from the first network node 110, 111, 140, and any message sent from the WD 120 to the first network node 110, 111, 140, is longer than a predetermined second time limit. The predetermined second time limit may be comprised in the set of time limits.

Consider a WD 120 with a 3G USIM that is adapted to use both UTRAN and GERAN. Because of the mutual authentication required between the WD 120 and the network node 110, 111, 140, a non-legitimate device 150 trying to impersonate a legitimate network node 110, 111, 140 also needs to authenticate itself to the WD 120. However, an attacker operating the non-legitimate device 150 does not possess the correct keys and therefore cannot authenticate to the WD 120. Hence, the attacker must first obtain the IMSI of the WD 120 and then impersonate the WD 120 towards the legitimate network node 110, 111, 140. When the legitimate network node 110, 111, 140 sends an authentication request including an Authentication Token (AUTN), the attacker may store this AUTN and discontinues the authentication procedure. Next, the attacker lures the WD 120 to connect to a GSM RBS of the non-legitimate device 150 and uses the stored AUTN in the authentication procedure with the WD 120. The valid AUTN will be accepted by the WD 120. Thereafter, the non-legitimate device 150 may request the WD 120 to not encrypt the traffic to the network node, and by using a separate legitimate connection, i.e. with a valid USIM, to the legitimate network node 110, 111, 140, the attacker may succeed in being a MitM.

If the network node 110, 111, 140 does not receive an authentication response from the WD 120 within a time period specified by a timer T3260, which is specified in 3GPP TS 24.008, the network node 110, 111, 140 aborts the authentication procedure. When the time difference between an authentication request sent to a WD 120 and any other message received from the WD 120 is larger than a configured value, this may be an indication that the corresponding IMSI or IMEI has been communicating with the non-legitimate device 150, i.e. has fallen victim to a false RBS attack.

One way to capture the behavior described above in relation to the second embodiment is to place a second rule, which may also be referred to as "Rule #2=the time difference between an authentication request and any message from the WD 120 is more than a predetermined second time limit" in the detecting node 101. The second time limit may be in a range of 1 second up to e.g. 30 minutes. Setting a low time limit increase the chances of detecting that a WD 120 has been communicating with a non-legitimate device 150 but may also lead to an increased number of false positives. Setting a high time limit reduces the risk of false positives but may increase the risk of not detecting that a WD 120 has been communicating with a non-legitimate device 150.

A WD 120 moving in a fast car or having its battery etc. replaced will perform a re-attachment within 30 minutes. Preferably the second time limit may be in the near range of the period specified by the timer T3260, or any other corresponding timer. The current specified time period for T3260 is 12 seconds. Accordingly, the second time limit may be set between 12 to 60 seconds. However any other time period specified in future RATs may be used as a baseline for setting the range. If the attack lasts 45 minutes, the WD 120 will come back to its legitimate network after 45 minutes and the detecting node 101 will be able to detect that the discontinuity after the authentication request sent from the legitimate network node 110, 111, 140 was longer than the predetermined number of minutes, such as e.g. 20 minutes. Note that victims of a DoS attack caused by a false LTE RBS by sending TAU and Attach rejects, as described in [LTE-ATTACKS], may also be detected with this second embodiment of the method herein.

There may however be legitimate reasons for the WD 120 not responding to the authentication request within the predetermined time, which may lead to false positives. A false positive is determined when the detecting node 101 determines that the WD 120 has been communicating with a non-legitimate device although there is another legitimate reason for the WDs 120 behavior. The WD 120 might e.g. have moved to a new location, e.g. if the WD 120 is located in a fast moving car, and therefore did not respond to the authentication request, or the WD 120 might have suddenly changed its RAT type, e.g. when its user manually chooses 'GSM only' while the UMTS authentication procedure is in progress. In either case, if the WD 120 is still connected to the first domain of the communications network 100 after having failed to respond to the authentication request, all the messages that the WD 120 sends either via a different RAT or from a different location will be visible to the communications network 100 via the core network. Hence, the messages sent by the WD 120 will also be visible to the detecting node 101 deployed in the communications network 100. In order to reduce the number of false positives, i.e. when the detecting node 101 determines the WD 120 to have been connected to a non-legitimate device 150 although the WD 120 didn't respond to the authentication request for some legitimate reasons, the detection mechanism may be strengthened by keeping a history of how often the event occurs for WDs 120 in a particular cell or a particular tracking area. If the event occurs frequently in the same area during a relatively short period of time, it can increase the confidence that these events are a result of a non-legitimate device 150. The underlying assumption is that the non-legitimate device 150 may attack more than one WD 120 in its reach.

According to a third embodiment a WD 120 may be determined to have been connected to a non-legitimate device when the WD 120 with a particular IMSI initiates a network attachment while the CN has a valid context for that IMSI. Herein, the protocol event which the detecting node 101 has obtained information about is the initiation of a network attach procedure. The detecting node 101 determines the WD 120 to have been communicating with the non-legitimate device 150 when the WD 120 has a valid core network context and initiates a network attachment procedure within a third time limit from the time instance of a previous network attachment procedure. The third time limit may be comprised in the set of time limits.

A non-legitimate device 150, such as a false RBS, generally collects IMSIs by first alluring the WD 120 to its cell, then provoking the WD 120 to update its location, and finally requesting the WD 120 to send its IMSI in an identity response message. The non-legitimate device may discontinue communication with the WD 120 after it has collected the IMSI, or it may stop its operation. The WD 120 which has been communicating with the non-legitimate device 150, will eventually attach to the legitimate network node 110 111, 140. The detecting node 101 may detect when an unusually large number of WDs are reattaching to the network despite the CN having a valid context for them. The corresponding IMSIs or IMEIs are potential victims of the attack. Note that a WD 120 that is restarted, e.g. manually rebooted, has had its battery changed etc., will also have similar behavior. However, a relatively large number of WDs 120 showing such a behavior from the same location more or less simultaneously is an indication that these WDs 120 have been connected to a non-legitimate device 150. Hence, detecting node 101 may further determine the WD 120 to have been communicating with the non-legitimate device 150 when a total number of network attachment procedures initiated within the third time limit from the time instance of the previous network attachment procedure in a cell is above a first threshold.

The above behavior may be captured by placing the following two rules in the detecting node 101. "Rule #3=the time difference between network attach messages from a WD 120 in the same location and with a valid CN context is less than a third time limit", "Rule #4=the time difference between Y consecutive activations of Rule #3 is less than a fourth time limit", where the third and the fourth time limit and the parameter Y may be derived manually based on past statistics, or automatically predicted using e.g. machine learning. The relevant information for analysis and storage in this embodiment may be for example IMSI, IMEI, TAI, type of message, time of message, and validity of CN context.

The third time limit may be in the range of seconds to minutes. In one embodiment the third time may be in the range of 1-60 minutes, since a reboot or a battery change of the WD 120 will finish within 60 minutes. In a further embodiment the third time limit may be in the range of 5-60 seconds, since the time it takes for a non-legitimate device to lure a WD 120 to its cell, ask for an IMSI and then stop communication is usually in the range of a couple of seconds. Setting a low time limit increases the chances of detecting that a WD 120 has been communicating with a non-legitimate device 150 but may also lead to an increased number of false positives. Setting a high time limit reduces the risk of false positives but may increase the risk of not detecting that a WD 120 has been communicating with a non-legitimate device 150.

The fourth time limit may in some embodiments be in the range of hours, such as e.g. 1-5 hours, since an attack from the non-legitimate device may last for some hours. However, a WD 120 usually falls victim within minutes. Hence, in a further embodiment the fourth time limit may be in the range of 1-15 minutes.

Setting a low time limit increases the chances of detecting that a WD 120 has been communicating with a non-legitimate device 150 but may also lead to an increased number of false positives. Setting a high time limit reduces the risk of false positives but may increase the risk of not detecting that a WD 120 has been communicating with a non-legitimate device 150.

According to a fourth embodiment the WD 120 may be determined to have been connected to a non-legitimate device when the WD 120 associated with a given IMSI frequently reports different security capabilities to the core network.

A mobile user is unlikely to stay in the same location for a very long time. For example, an office worker would travel to the office in the morning, stay in office during working hours, and travel back home after work. Unless the attacker follows the victim all the time, it is unlikely that the victim is under attack continuously for a very long time. An attacker may perform a bidding down attack on capabilities negotiation, as described above. If the attacker is intercepting the victim's calls only during official hours, the detecting node may detect that the security capabilities of the WD 120 are not same during office and non-office hours. Normally, the security capabilities of one WD, i.e. the same IMEI, should not change, and the security capabilities associated with a subscriber i.e. same IMSI, should only change when the subscriber switches to another WD 120. Therefore, frequent changes in security capabilities of the WD 120 may be an indication that the corresponding WD may have been connected to a non-legitimate device 150. Hence, according to the fourth embodiment herein, the protocol event may be a reporting of security capabilities from the WD 120 to the communications network (100). The security capabilities may be reported to any of the network nodes 110, 111, 140. The detecting node may determine the WD 120 to have been communicating with the non-legitimate device 150 when the time difference between two differing security capabilities reported by WD 120 to the communications network 100 is within a fifth time limit. The fifth time limit may be a predetermined time limit and may be comprised in the set of time limits.

The above behavior may be captured by placing the following rule in the detecting node 101. An example of a rule to detect the behavior described above is "Rule #5=the time difference between different security capabilities belonging to an IMSI is less than a predetermined fifth time limit". The fifth time limit may be derived manually based on past statistics, or predicted automatically e.g. via machine learning. The predetermined fifth time limit may e.g. be in the range of minutes to days. In one embodiment the fifth time limit may be in the range of 1 to 90 days. This embodiment would e.g. detect a WD 120 that is being targeted all the time during a specific event, such as e.g. a demo week or a festival month. In a further embodiment the fifth time limit may e.g. be in the range of 1-60 minutes, which would detect a WD 120 that is being targeted for a short time. Setting a low time limit increases the chances of detecting that a WD 120 has been communicating with a non-legitimate device 150 but may also lead to an increased number of false positives. Setting a high time limit reduces the risk of false positives but may increase the risk of not detecting that a WD 120 has been communicating with a non-legitimate device 150.

In a third embodiment, the fifth time limit may be in the range of e.g. 1-10 hours. This would detect a WD 120 that has been communicating with the non-legitimate device 150 for a part of a day, such as when the WD 120 is located e.g. at an office during office hours. If the WD 120 is connected to the non-legitimate device at the office, it might change the security capabilities when a user of the WD leaves the office to go home. Setting a low time limit increases the chances of detecting that a WD 120 has been communicating with a non-legitimate device 150 but may also lead to an increased number of false positives. Setting a high time limit reduces the risk of false positives but may increase the risk of not detecting that a WD 120 has been communicating with a non-legitimate device 150.

In a GSM network, the security capabilities may be collected from the Mobile Station Classmark information elements contained in e.g. a Location Updating Request and in Classmark Change messages. The detecting node 101 may store or update previously stored profiles for each WD 120 with information on IMSI such as IMEI, supported encryptions, and time of recording. When the detecting node 101 detects that the supported encryptions belonging to an IMSI have changed and that the time difference is less than the fifth time limit, then according to Rule #5, the IMSI may be flagged as a potential victim.

It may further be possible that the security capabilities of an IMSI have changed because the user changed its WD. The detecting node may prevent false positive determination that the WD 120 to have been connected to a non-legitimate device by checking whether the IMEI associated to the IMSI has also changed.

According to a fifth embodiment herein the WD 120 may be determined to have been connected to a non-legitimate device 150 when a location update procedure, other than of a periodic-type, is observed before the expiry of a periodic location update timer.

Hence, according to the fifth embodiment herein, the protocol event may be a location update procedure. The detecting node 101 may determine the WD 120 to have been communicating with the non-legitimate device 150 when a time difference between the time instances of two location update procedures for the WD 120 is less than a sixth time limit. The sixth time limit may be comprised in the set of time limits, and may correspond to a periodic location update timer.

In an LTE network, a WD 120 sends Tracking Area Update (TAU) requests in various situations such as e.g. when entering a Tracking Area that is not in its Tracking Area Identity (TAI) list, when receiving an indication that an RRC connection was released with a cause referred to as "load balancing TAU required", or when the WD 120 changes its network capabilities. Besides these situations, the WD 120 also sends periodic TAU requests to the network in order to regularly notify the network about the WD's 120 presence. A timer called T3412 determines the period, the timer is further defined in 3GPP TS 24.301 8.0.0. If a WD remains within the tracking areas in its TAI list, and supposing that the T3412 is set to e.g. 60 minutes, the network expects a TAU request only once every 60 minutes.

When a WD 120 that has been communicating with a non-legitimate device returns to the legitimate network, the WD 120 will send a new TAU request to a network node 110, 111, 140. If the attack from the non-legitimate device 150 lasted for 45 minutes, the network will receive a new TAU request from the WD 120 earlier than expected. This discrepancy in the TAU request timings is an indication that the WD 120 has fallen victim to a false RBS attack, i.e. has been communicating with a non-legitimate device 150.

To detect the above scenario, the following rule may be added to the detecting node 101: "Rule #6=the time difference between two TAU requests from a WD 120 in a tracking area listed in the WD's TAI list is less than a predetermined sixth time limit". The sixth time limit may correspond to a periodic location update timer, such as the timer T3412 or any corresponding timer in future RATs. The timer T3412 can according to current specifications be set in the range of seconds to hours. According to current specifications the default value of T3412 is 54 minutes and the maximum value for T3412 is 192 mins. T3412 may however also be set to a low value in seconds. In a further embodiment however, the sixth time limit may e.g. be in the range of 5 seconds to 6 hours, such as e.g. 5-120 seconds or 1-6 hours. This may e.g. be the case in RATs where the T3412 timer is not available. Setting a low time limit increases the chances of detecting that a WD 120 has been communicating with a non-legitimate device 150 but may also lead to an increased number of false positives. Setting a high time limit reduces the risk of false positives but may increase the risk of not detecting that a WD 120 has been communicating with a non-legitimate device 150.

When a TAU request from a WD 120 is received by the detecting node 101, the detecting node 101 may check if there is already any TAU request information related to the corresponding WD 120 stored. If there is no previous information, the detecting node may store any or both of the IMSI or the IMEI, together with TAI and TAU request time in a profile for the corresponding WD 120. When a new TAU request from the WD 120 is received, the detecting node 101 may consult the stored profile data to check if there has been a new TAU request from the WD 120 within its TAI list. Then, the detecting node 101 may calculate the time difference between these two TAU requests. If the time difference is less than the predetermined time limit, such as e.g. 60 minutes, the detecting node may determine that the WD 120, has been communicating with a non-legitimate device 150, i.e. is a victim of a false RBS attack. Note that even though the TAI list is not in the TAU request message itself, the detecting node 101 may learn it from other messages e.g. earlier TAU accept messages or may retrieve it directly from a core network node 140, such as an MME, via any existing or new interface.

In case the attack lasts for a longer time than the periodic timer, such as e.g. for 90 minutes, the detecting node 101 may determine the WD 120 to have been connected to the non-legitimate device since there was no periodic TAU request when expected, and there is a new TAU request earlier than the next expected time according to the periodic update timer. However, there may also be other reasons for the late TAU request, since a late TAU request may also come from a WD 120 that returns to network coverage after having been out of coverage for 90 minutes, e.g. if the WD 120 has been located in a basement. Therefore, an indication based on a delayed TAU request may be used in combination with indications from other embodiments in order to limit the chances of the WD 120 being wrongfully determined to have been connected to the non-legitimate device 150.

Moreover, when a false RBS attack is ongoing, a plurality of WDs 120 may try to camp on the non-legitimate device 150. Generally, the WDs 120 that are not of interest to the attacker are sent back to a network node in their legitimate network, i.e. to a network node associated with the first domain of the communications network 100. When these WDs 120 reconnect to a network node in the first domain, they will send TAU Requests to the legitimate network. Thereby the detecting node 101 may determine an unusually high number of early TAU requests within a short time from different WDs 120. Each WD 120 will in this case trigger Rule #6. Hence, these WDs 120 may further be determined to have been connected to the non-legitimate device 150 when the number of WDs 120 triggering Rule #6 is more than a predefined number within a predefined seventh time limit. The predefined number of WDs 120 may e.g. be more than 2, preferably more than 5. This may e.g. be implemented by further adding the following rule to the detecting node 101: "Rule #7=the number of WDs triggering Rule #6 is not more than X WDs within the seventh time limit". Thereby, the detecting node 101 may produce an even more confident determination that the WD 120 has been communicating with the non-legitimate device 150.

The seventh time limit may e.g. be in the range of seconds to hours, such as e.g. 5 seconds to 6 hours. In one embodiment the seventh time limit may be in the range of 5-120 seconds. This embodiment may detect when the non-legitimate device 150 aggressively, i.e. very quickly, sends back uninteresting WDs 120 to the legitimate network. In a further embodiment the seventh time limit may be in the range of 1-6 hours. This embodiment may detect WDs 120 having been connected to the non-legitimate device for a longer time. A further embodiment may be in the range of 1-60 minutes. This embodiment may detect WDs 120 uninteresting for the non-legitimate device 150 that are being sent back to the legitimate network in a less aggressive manner. Setting a low time limit increases the chances of detecting that a WD 120 has been communicating with a non-legitimate device 150 but may also lead to an increased number of false positives. Setting a high time limit reduces the risk of false positives but may increase the risk of not detecting that a WD 120 has been communicating with a non-legitimate device 150.

According to a sixth embodiment a WD 120 may be determined to have been connected to the non-legitimate device 150 when the WD 120 does not respond to Paging in a certain location, but performs a location update procedure at the same location within a predefined eight time limit.

The non-legitimate device 150 may act as a MitM according to the second type described above, i.e. the non-legitimate device 150 acts as a network towards the WD 120, while acting as a valid WD 120, with a separate valid subscription, towards the legitimate network. In such a scenario the legitimate network would not receive any response to Paging messages sent to the WD 120 during the time the WD 120 is connected to the non-legitimate device 150. When the WD 120 returns to the legitimate network, the WD 120 will send a TAU request to a network node of the legitimate network. If the TAU request is sent from the same location in which the WD 120 did not respond to the Paging message, this may be an indication that the associated WD 120 may have been connected to the non-legitimate device 150, i.e. is a potential victim of a false base station. In case the battery of the WD 120 would have drained out, the WD 120 would attach to the network, instead of sending a TAU request, once the battery has been replaced or charged.

Hence, according to the sixth embodiment herein the protocol event may be a paging of the WD 120. The detecting node 101 may determine the WD 120 to have been communicating with the non-legitimate device 150 when the WD 120 does not respond to the paging in a certain location, but performs a location update procedure at the same location within a predetermined eight time limit from the time instance of the paging. The predetermined eight time limit may be comprised in the set of time limits.

This embodiment may be implemented by adding the rule following rule to the detecting node 101: "Rule #8=the time difference between a Paging message and a subsequent TAU request from the same location is more than a predetermined eight time limit". The eight time limit may be derived manually based on past statistics, or predicted automatically e.g. via machine learning. The predetermined eight time limit may be in the range of seconds to hours or days. In one embodiment the eight time limit may e.g. be in the range of 5-60 seconds, since the paging procedure is normally completed within seconds. In a further embodiment the eight time limit may be in the range of 1-24 hours. This embodiment may detect WDs that have been out of coverage for some hours, e.g. when located in a basement. The eight time limit may in some embodiments also be in the range of 1-90 days, which may detect WDs 120 that have been out of coverage for some days, e.g. when a user is hiking. In a preferred embodiment the eight time limit may be in the range of e.g. 1-60 minutes. The eight time limit may correspond to a Paging timer which is network dependent and may be in the range of 1-60 minutes. Setting a low time limit increases the chances of detecting that a WD 120 has been communicating with a non-legitimate device 150 but may also lead to an increased number of false positives. Setting a high time limit reduces the risk of false positives but may increase the risk of not detecting that a WD 120 has been communicating with a non-legitimate device 150.

Note that if a WD 120 is out of coverage, e.g. when the WD 120 is located in a basement, it may not respond to Paging. However, when the returns to the network coverage, it may send a TAU request. Hence, in order to improve the result of the determining this embodiment may be combined with indications from the other embodiments of the method disclosed herein. A plurality of the embodiments disclosed above may be combined.

According to a seventh embodiment of the method herein, a WD 120 may be determined to have been connected to a non-legitimate device 150 when the WD 120 moves between two locations within a time period shorter than what is reasonably possible considering the laws of physics and the geographic distance between said locations.

To increase stealthiness or to target only a particular WD 120, a non-legitimate device 150 may send other irrelevant WDs 120 back to their legitimate network. The non-legitimate device 150 may do so by deliberately sending bad signals to the irrelevant WDs causing them to connect to a better cell, i.e. a cell with a better channel quality. In addition, to prevent those WDs from quickly reconnecting to the non-legitimate device 150 again, the non-legitimate device 150 may construct its neighbor cell list to ensure that the irrelevant WDs 120 do not select the non-legitimate device 150 again for a longer time. For example, the non-legitimate device 150 may choose to exclude all its direct neighbors from its neighbor cell list. Thereby, the WD 120 will not connect to a direct neighbor cell but to a cell of a network node located further away. When the WDs 120 change cell and send TAU requests, the detecting node 101 may examine the time differences between the TAU requests and determine if it is physically possible for the WD 120 to cover the distance between the TAIs within that time difference. If a large distance is covered within a short time period this may be an indication that the corresponding WD 120 has been communicating with a non-legitimate device 150. In order to perform this evaluation the detecting node may obtain or may be provided with the physical locations of its Tracking Areas. This information may e.g. be retrieved from cell planning data.

Hence, according to the seventh embodiment herein the protocol event may be a TAU request from the WD 120. The detecting node 101 may determine the WD 120 to have been communicating with the non-legitimate device 150 when the time difference between the time instances of two TAU requests is shorter than an ninth time limit. The ninth time limit may be comprised in the set of time limits. The ninth time limit may further corresponds to a shortest time in which the WD 120 is able to cover a distance between two tracking areas.

The above scenario may be captured by adding the following rule in the detecting node 101: "Rule #9=the time difference between the last TAU requests and the current TAU request exceeds the geographic distance between the corresponding TAIs divided by V", where V is a suitably chosen upper bound on realistic speed of WD movement. As an example V=1500 km/h or V=c, i.e. the speed of light. The assumption here is that it is not possible to travel 5 km in 1 minute for a normal WD 120.

The relevant information in this embodiment, for analysis and storage, may be for example IMSI, time of TAU request, TAI, and geographical location of the TAI. The geographical location corresponding to a TAI may be provided e.g. from cell planning data.

It shall be noted that the time limits referred to in here, may also be seen as a time period having a specific length.

Action 3030

The method may further comprise providing an indication to an external system that the WD 120 has been communicating with the non-legitimate device 150 when the detecting node 101 has determined the WD 120 to have been connected to the non-legitimate device 150.

The detecting node 101 may e.g. update a stored WD profile with the new information. The detecting node 101 may further indicate that the WD 120 has been communicating with the non-legitimate device 150, by taking various actions such as e.g. triggering an alarm in e.g. a network operation center. Triggering the alarm may raise the alert level. The detecting node 101 may also raise a warning message providing an alert on a possible presence of a false or rogue base station in the area, which may be sent to the WD 120 or to a second receiver, such as e.g. the network provider and/or the police. The alerting may e.g. be performed via email and/or SMS.

Figure 4:
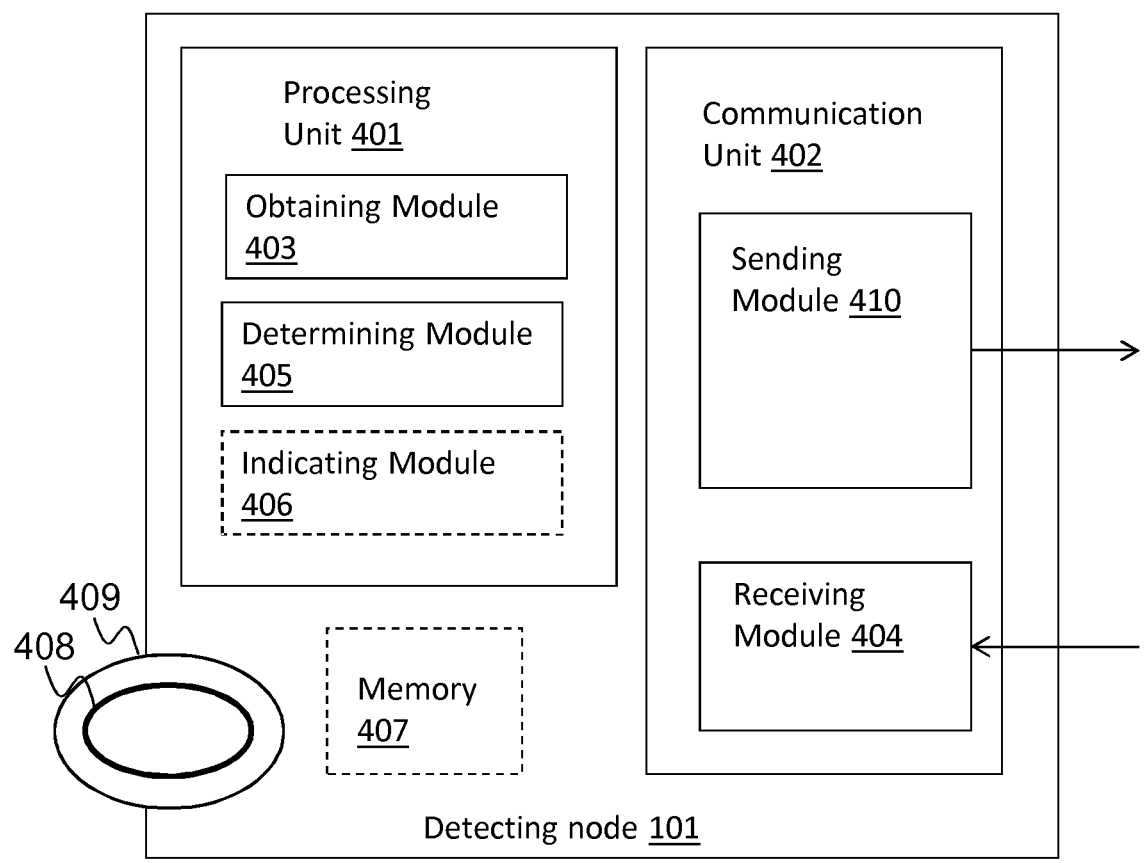
FIG. 4 is a schematic block diagram illustrating a detecting node according to some embodiments herein.

To perform the method actions for determining that a WD 120 described above in relation to FIG. 3, the detecting node 101 may comprise the following arrangement depicted in FIG. 4.

The detecting node 101 is comprised in a communications network 100. The WD 120 is associated with a first domain of the communications network 100 and the non-legitimate device 150 is a device associated with a second domain of the communications network 100. The non-legitimate device impersonates a network node 110, 111, 140 of a first domain of the communications network 100. The detecting node 101 comprises a processing unit 401 and a communication unit 402 for communicating with network devices, such as other network nodes 110, 111, 140.

The detecting node 101 is configured to, e.g. by means of an obtaining module 403 and/or a receiving module 404 and/or the processing unit 401 being configured to, obtain information regarding one or more protocol events related to the communication between the WD 120 and a first network node 110, 111, 140, wherein the information comprises a time instance related to the one or more protocol events.

The detecting node 101 is further configured to, e.g. by means of a determining module 405 and/or the processing unit 401 being configured to, determine, based on a time instance and a set of time limits related to the one or more protocol events, that the WD 120 has been communicating with the non-legitimate device 150.

The detecting node 101 may, when the protocol event is a sending of an RRC message, further be configured to, e.g. by means of the determining module 405 and/or the processing unit 401 being configured to, determine that the WD 120 has been communicating with the non-legitimate device 150 when the number of RRC messages to the first network node 110, 111, 140, is reduced to a level below a first threshold and a corresponding increase is not detected in a set of second network nodes 110, 111, 140, within a first time limit from the time instance of the reduction of RRC messages to a level below the first threshold.

The detecting node 101 may, when the protocol event is an authentication procedure, further be configured to, e.g. by means of the determining module 405 and/or the processing unit 401 being configured to, determine that the WD 120 has been communicating with the non-legitimate device 150 when a time between a time instance of an authentication request sent to the WD 120 from the first network node 110, 111, 140, and any message sent from the WD 120 to the first network node 110, 111, 140, is longer than a second time limit.

The detecting node 101 may, when the protocol event is an initiation of a network attach procedure, further be configured to, e.g. by means of the determining module 405 and/or the processing unit 401 being configured to, determine that the WD 120 has been communicating with the non-legitimate device 150 when the WD 120 has a valid core network context and initiates a network attachment procedure within a third time limit from the time instance of the previous network attachment procedure.

The detecting node 101 may, when the protocol event is an initiation of a network attach procedure, further be configured to, e.g. by means of the determining module 405 and/or the processing unit 401 being configured to, determine that the WD 120 has been communicating with the non-legitimate device 150, when a network attachment procedure initiated within the third time limit from a time instance of a previous network attachment procedure, by a WD 120 having a valid core network context, occurs more than a predetermined first number of times within a predetermined fourth time limit.

The detecting node 101 may, when the protocol event is a reporting of security capabilities from the WD (120) to a core network, further be configured to, e.g. by means of the determining module 405 and/or the processing unit 401 being configured to, determine that the WD 120 has been communicating with the non-legitimate device 150 when the time difference between two differing security capabilities reported by WD 120 to the communications network 100 is within a fifth time limit.

The detecting node 101 may, when the protocol event is a location update procedure, further be configured to, e.g. by means of the determining module 405 and/or the processing unit 401 being configured to, determine that the WD 120 has been communicating with the non-legitimate device 150 when a time difference between the time instances of two location update procedures for the WD 120 is less than a sixth time limit.

The detecting node 101 may, when the protocol event is a paging of the WD 120, further be configured to, e.g. by means of the determining module 405 and/or the processing unit 401 being configured to, determine that the WD 120 has been communicating with the non-legitimate device 150 when the WD 120 does not respond to the paging in a certain location, but performs a location update procedure at the same location within a predetermined eight time limit from the time instance of the paging.

The detecting node 101 may, when the protocol event is a TAU request from the WD 120, further be configured to, e.g. by means of the determining module 405 and/or the processing unit 401 being configured to, determine that the WD 120 has been communicating with the non-legitimate device 150 when the time difference between the time instances of two TAU requests is shorter than the ninth time limit. The ninth time limit corresponds to a shortest time in which the WD 120 is able to cover a distance between two tracking areas.

The detecting node 101 may further be configured to, e.g. by means of an indicating module 406, a sending module 410 and/or the processing unit 401 being configured to, provide an indication to an external system that the WD 120 has been communicating with the non-legitimate device 150 when the detecting node 101 has determined the WD 120 to have been connected to the non-legitimate device 150.

The detecting node 101 may further be configured to, e.g. by means of the obtaining module 403 and/or the receiving module 404 being configured to, obtain the information by being configured to receive a message comprising information regarding one or more protocol events from a WD 120 and/or a network node 110, 111, 140.

The embodiments herein for detecting false base stations may be implemented through one or more processors, such as the processing unit 401 in the detecting node 101 depicted in FIG. 4, together with computer program code for performing the functions and actions of the embodiments herein. The program code mentioned above may also be provided as a computer program product, for instance in the form of a data carrier carrying computer program code for performing the embodiments herein when being loaded into the in the detecting node 101. One such carrier may be in the form of a CD ROM disc. It is however feasible with other data carriers such as a memory stick. The computer program code may furthermore be provided as pure program code on a server and downloaded to the detecting node 101.

The detecting node 101 may further comprise a memory 407 comprising one or more memory units. The memory 407 is arranged to be used to store obtained information, measurements, data, configurations, schedulings, and applications to perform the methods herein when being executed in the detecting node 101.

The methods according to the embodiments described herein for the detecting node 101 are respectively implemented by means of e.g. a computer program 408 or a computer program product, comprising instructions, i.e., software code portions, which, when executed on at least one processor, cause the at least one processor to carry out the actions described herein, as performed by the detecting node 101. The computer program 408 may be stored on a computer-readable storage medium 409, e.g. a disc or similar. The computer-readable storage medium 409, having stored thereon the computer program 408, may comprise the instructions which, when executed on at least one processor, cause the at least one processor to carry out the actions described herein, as performed by the detecting node 101. In some embodiments, the computer-readable storage medium may be a non-transitory computer-readable storage medium.

Those skilled in the art will also appreciate that the obtaining module 403, the determining module 405 and the indicating module 406 described above may refer to a combination of analog and digital circuits, and/or one or more processors configured with software and/or firmware, e.g. stored in the memory 407, that when executed by the one or more processors such as the processing unit 401 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

When using the word "set" herein, it shall be interpreted as meaning "one or more".

The embodiments herein are not limited to the above described preferred embodiments. Various alternatives, modifications and equivalents may be used. The embodiments herein for detecting that a WD has been communicating with a non-legitimate device may e.g. be combined in any suitable manner in order to increase the quality of detection and to limit the number of false positives. Any suitable combination of the time limits disclosed in relation to the different embodiments may also be provided in order to increase the quality of the detection. Therefore, the above embodiments should be regarded as illustrative and not be taken as limiting the scope of the invention, which is defined by the appending claims.

The invention claimed is:

1. A method, performed by a detecting node in a communications network, for detecting that a wireless device (WD), associated with a first domain of the communications network, has been communicating with a non-legitimate device, associated with a second domain of the communications network, that impersonates a network node of the first domain, and the method comprising:
    obtaining information regarding one or more protocol events related to the communication between the WD and a first network node, wherein the information comprises a time instance related to the one or more protocol events; and
    determining, based on the time instance and a set of time limits related to the one or more protocol events, that the WD has been communicating with the non-legitimate device,
    wherein:
    the protocol event is a sending of an RRC message,
    the set of time limits comprises a first time limit, and
    determining that the WD has been communicating with the non-legitimate device comprises:
    determining that a number of radio resource control (RRC) messages to the first network node is reduced below a first threshold at the time instance; and
    detecting no corresponding increase in the number of RRC messages to a set of second network nodes within the first time limit after the time instance.

2. The method according to claim 1, wherein:
    the protocol event is an authentication procedure,
    the set of time limits comprises a second time limit,
    the time instance corresponds to when an authentication request is sent to the WD from the first network node, and
    determining that the WD has been communicating with the non-legitimate device comprises determining that a difference between the time instance of the authentication request sent to the WD from the first network node and when any messages are sent from the WD to the first network node is longer than said second time limit.

3. The method according to claim 1, wherein:
    the protocol event is an initiation of a network attach procedure,
    the set of time limits comprises a third time limit,
    the time instance corresponds to a previous network attachment procedure, and
    determining that the WD has been communicating with the non-legitimate device comprises detecting that the WD has a valid core network context and initiates a network attachment procedure within the third time limit after the time instance.

4. The method according to claim 3, wherein the set of time limits comprises a fourth time limit, and determining that the WD has been communicating with the non-legitimate device further comprises detecting that the WD initiated the network attach procedure more than a predetermined first number of times within the fourth time limit.

5. The method according to claim 1, wherein:
the protocol event is a reporting of security capabilities from the WD to the communications network,
the set of time limits comprises a fifth time limit, and
the WD is determined to have been communicating with the non-legitimate device when the time difference between reports by the WD to the communications network is within the fifth time limit, the respective reports comprising differing WD security capabilities.

6. The method according to claim 1, wherein:
the protocol event is a location update procedure,
the set of time limits comprises a sixth time limit corresponding to a periodic location update timer,
the time instance corresponds to the occurrence of a first location update procedure for the WD,
a further time instance corresponds to the occurrence of a second location update procedure for the WD, and
determining that the WD has been communicating with the non-legitimate device comprises detecting that the difference between the time instance and the further time instance is less than the sixth time limit.

7. The method according to claim 1, wherein:
the protocol event is a paging of the WD,
the set of time limits comprises an eighth time limit, and
determining that the WD has been communicating with the non-legitimate device comprises detecting that the WD does not respond to the paging in a particular location at the time instance, but performs a location update procedure at the particular location within the eighth time limit after the time instance.

8. The method according to claim 1, wherein:
the protocol event is a Tracking Area Update (TAU) request from the WD,
the set of time limits comprises a ninth time limit, which corresponds to a shortest time in which the WD is able to cover a distance between two tracking areas, and
determining that the WD has been communicating with the non-legitimate device comprises detecting that a second TAU request from the WD occurs within the ninth time limit after a first TAU request from the WD at the time instance.

9. The method according to claim 1, wherein the obtaining of the information regarding one or more protocol events related to the communication between the WD and a first network node comprises receiving a message comprising information regarding one or more protocol events from a WD and/or a network node.

10. A non-transitory, computer-readable medium storing computer-executable instructions that, when executed on at least one processor comprising a network node, configure the network node to perform operations corresponding to the method of claim 1.

11. The method according to claim 1, further comprising:
providing an indication to an external system that the WD has been communicating with the non-legitimate device when the detecting node has determined the WD to have been connected to the non-legitimate device.

12. A detecting node, in a communications network, that is configured to detect that a wireless device (WD), associated with a first domain of the communications network, has been communicating with a non-legitimate device, associated with a second domain of the communications network, that impersonates a network node of the first domain, wherein the detecting node comprises:
one or more processors; and
a computer-readable storage medium comprising instructions that, when executed by the one or more processors, configure the detecting node to:
obtain information regarding one or more protocol events related to the communication between the WD and a first network node, wherein the information comprises a time instance related to the one or more protocol events; and
determine, based on the time instance and a set of time limits related to the one or more protocol events, that the WD has been communicating with the non-legitimate device,
wherein
the protocol event is a sending of an RRC message, and
the set of time limits comprises a first time limit,
execution of the instructions configures the detecting node to determine that the WD has been communicating with the non-legitimate device based on:
determining that a number of radio resource control (RRC) messages to the first network node is reduced below a first threshold at the time instance; and
detecting no corresponding increase in the number of RRC messages to a set of second network nodes within the first time limit after the time instance.

13. The detecting node according to claim 12, wherein:
the protocol event is an authentication procedure,
the set of time limits comprises a predetermined second time limit,
the time instance corresponds to when an authentication request is sent to the WD from the first network node, and
execution of the instructions configures the detecting node to determine that the WD has been communicating with the non-legitimate device based on determining that a difference between the time instance of the authentication request sent to the WD from the first network node and when any messages are sent from the WD to the first network node is longer than said second time limit.

14. The detecting node according to claim 12, wherein:
the protocol event is an initiation of a network attach procedure,
the set of time limits comprises a third time limit,
the time instance corresponds to a previous network attachment procedure, and
execution of the instructions configures the detecting node to determine that the WD has been communicating with the non-legitimate device based on detecting that the WD has a valid core network context and initiates a network attachment procedure within the third time limit after the time instance.

15. The detecting node according to claim 14, wherein the set of time limits comprises a fourth time limit, and execution of the instructions further configures the detecting node to determine that the WD has been communicating with the non-legitimate device based on detecting that the WD initiated the network attach procedure more than a predetermined first number of times within the fourth time limit.

16. The detecting node according to claim 12, wherein:
the protocol event is a reporting of security capabilities from the WD to a core network,
the set of time limits comprises a fifth time limit, and execution of the instructions configures the detecting node to determine that the WD has been communicating with the non-legitimate device when the time difference between reports by the WD to the communications network is within the fifth time limit, the respective reports comprising differing WD security capabilities.

17. The detecting node according to claim 12, wherein:
the protocol event is a location update procedure,
the set of time limits comprises a sixth time limit, which corresponds to a periodic location update timer,
the time instance corresponds to the occurrence of a first location update procedure for the WD,
a further time instance corresponds to the occurrence of a second location update procedure for the WD, and
execution of the instructions configures the detecting node to determine that the WD has been communicating with the non-legitimate device based on detecting that the difference between the time instance and the further time instance is less than the sixth time limit.

18. The detecting node according to claim 12, wherein:
the protocol event is a paging of the WD,
the set of time limits comprises an eighth time limit, and
execution of the instructions configures the detecting node to determine that the WD has been communicating with the non-legitimate device based on detecting that the WD does not respond to the paging in a particular location at the time instance, but performs a location update procedure at the particular location within the eighth time limit after the time instance.

19. The detecting node according to claim 12, wherein:
the protocol event is a Tracking Area Update (TAU) request from the WD,
the set of time limits comprises a ninth time limit, which corresponds to a shortest time in which the WD is able to cover a distance between two tracking areas, and
execution of the instructions configures the detecting node to determine that the WD has been communicating with the non-legitimate device based on detecting that a second TAU request from the WD occurs within the ninth time limit after a first TAU request from the WD at the time instance.

* * * * *